United States Patent Office 3,444,696
Patented May 20, 1969

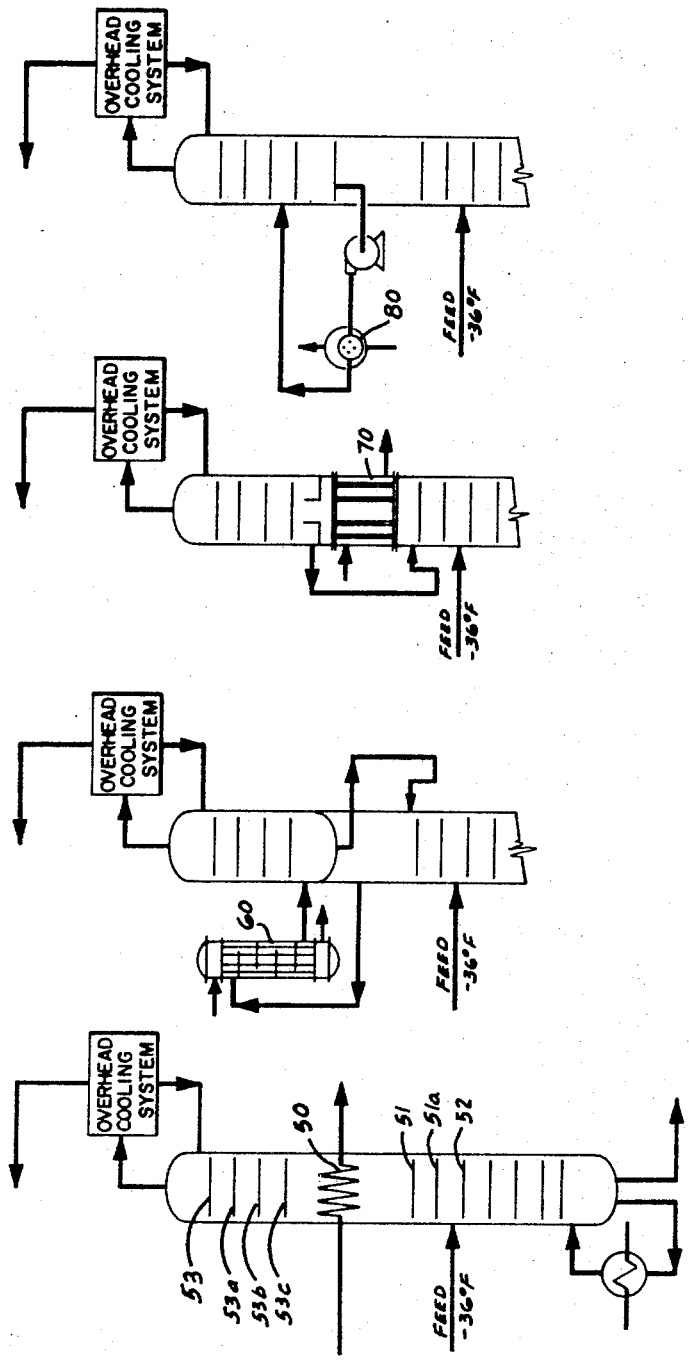

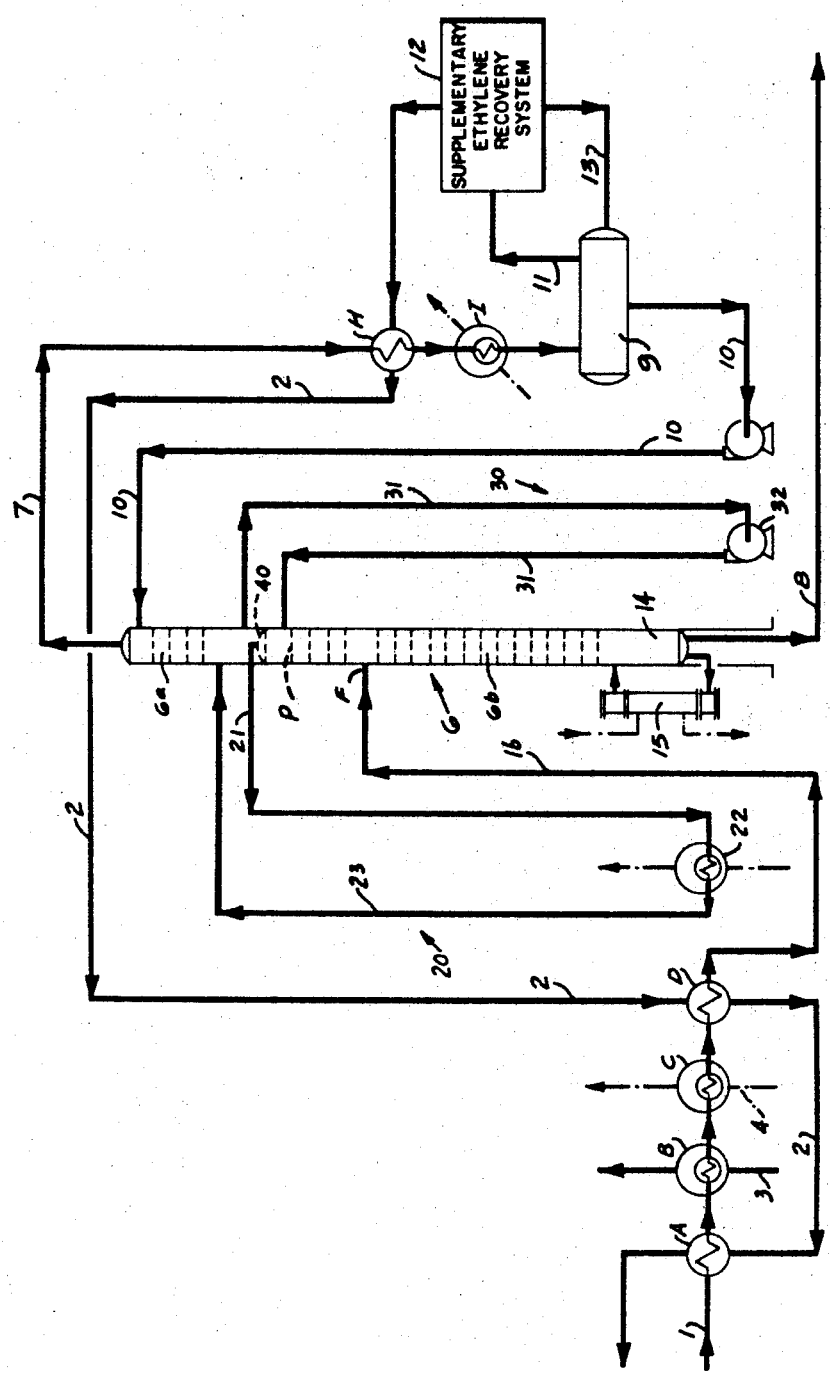

3,444,696
DEMETHANIZATION EMPLOYING DIFFERENT TEMPERATURE LEVEL REFRIGERANTS
Ray L. Geddes, Waban, and John K. Jacobs, Boston, Mass., assignors to Stone & Webster Engineering Corporation, Boston, Mass., a corporation of Massachusetts
Filed Feb. 10, 1967, Ser. No. 615,154
Int. Cl. F25j 3/02
U.S. Cl. 62—28                                   2 Claims

ABSTRACT OF THE DISCLOSURE

Feed is introduced into a demethanizer at a temperature in the range of —50° F. to —10° F. Heat is removed from an intermediate section in the demethanizer at a point above the feed point by evaporating liquid ethylene or ethane refrigerant at a temperature level in the range of —60° F. to —100° F. while reflux at the top of the demethanizer is produced by indirect heat exchange with liquid ethylene evaporating at a temperature level in the range of —120° F. to —165° F.

---

This invention relates to an improved demethanization process for the recovery of ethylene. More particularly, this invention pertains to a continuous fractionation process for the separation in an efficient manner with economic energy consumption, of ethylene and higher boiling hydrocarbons from mixtures containing hydrogen, methane and other constituents more volatile than ethylene.

The typical continuous demethanization process for the recovery of ethylene from gaseous feed mixtures containing components more volatile and less volatile than ethylene comprises the following steps:

(a) The feed gas is compressed and dried and subsequently pre-cooled by conventional cooling techniques to effect partial condensation thereof;

(b) The partially condensed feed mixture is then passed to a low temperature fractionator, generally referred to as a demethanizer. The demethanizer comprises the usual fractionating column having a number of fractionating plates or trays, the part of the column above the feed plate being the rectifying section and the part of the column including and below the feed plate being the stripping section;

(c) The feed is then fractionated in the demethanizer employing conventional fractionating techniques involving suitable reflux conditions to obtain as the main products (1) an overhead product which is principally methane and constituents more volatile than ethylene and (2) a bottoms product which is principally ethylene and less volatile constituents.

The pressures on the column for this fractionation may be varied over a wide range from atmospheric pressure, or lower, up to 600–800 p.s.i.a. which approaches the critical pressures for the desired fluid mixtures at the base of the stripping section. The design pressure for a specific plant is the result of a practical choice from considerations of technical and economic alternatives. The pressure depends upon the composition of feed and the sharpness of separation of methane and ethylene required. Even at the highest practicable pressures, it is necessary to conduct the fractionation at very low temperatures, requiring use of costly refrigeration to cool and condense the gas mixtures.

Because the capital and operating costs for refrigeration equipment are closely related to the power consumed in the gas compressors, it is instructive to compare the low temperature levels attainable with common refrigeration fluids, and the horsepower required for each million B.t.u./hr. absorbed in evaporating a fluid at a pressure near the boiling point, as follows:

|  | Normal Boiling Pt., °F. | BHP/MM B.t.u./Hr. |
|---|---|---|
| Ammonia ($NH_3$) | —28 | 150 |
| Propylene ($C_3H_6$) | —54 | 190 |
| Ethylene ($C_2H_4$) | —155 | 550 |
| Methane ($CH_4$) | —259 | 2,000 |
| Nitrogen ($N_2$) | —320 | 4,400 |

These horsepower figures are for commercial cascade refrigeration systems in which, for example, the heat absorbed by evaporating methane at —259° F. would be delivered in succession through ethylene and propylene refrigeration units to final absorption in cooling water at ambient temperatures. It is evident that there is a marked increase in horsepower required as the evaporating temperature level drops. Persons skilled in the art of demethanizer design and operation have found by experience that nitrogen refrigeration cannot be justified because of the high cost; also, that the consumption of the relatively expensive methane refrigeration should be reduced to the minimum that is practicable. This is accomplished in practice by designing the demethanizer tower for operation at high pressures where the reflux condensing temperatures are highest. The conventional practice resulting from over three decades of commercial operation in this field is to use a pressure of 400–550 p.s.i. gage dependent upon the hydrogen content in the feed. This enables the condensation of reflux at the top of the demethanizer by evaporation of ethylene liquid at —150 to —155° F., with production of an uncondensed hydrogen-methane stream containing only about 2.5 mol percent of ethylene.

In the drawings:

FIGURE 2 is a schematic view illustrating the general concept of effecting intermediate heat removal in the rectifying section in accordance with the improved demethanization process of this invention.

FIGURE 2A is a schematic view illustrating the application of an external partial condenser in effecting intermediate heat removal in the rectifying section in accordance with the improved demethanization process of this invention.

FIGURE 2B is a schematic view illustrating the application of an internal partial condenser in effecting intermediate heat removal in the rectifying section in accordance with the improved demethanization process of this invention.

FIGURE 2C is a schematic view illustrating the application of a recirculated cooled liquid phase in effecting intermediate heat removal in the rectifying section in accordance with the improved demethanization process of this invention.

FIGURE 3 is a flow diagram of an embodiment of the improved demethanization process of this invention illustrating the use of an external partial condenser for effecting intermediate heat removal in the rectifying section.

Figure 1:
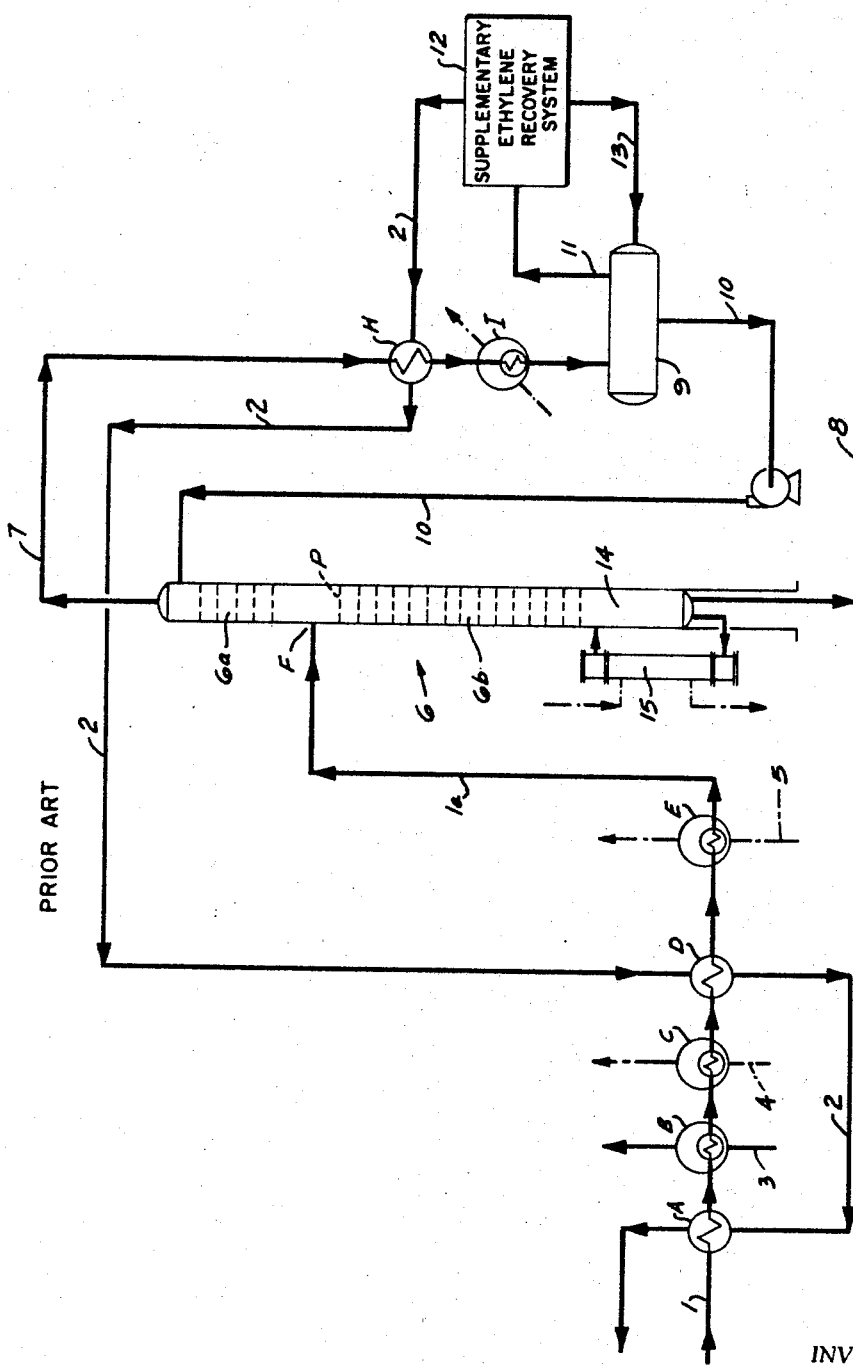
FIGURE 1 is a flow diagram of a conventional demethanization process.

As indicated above, a simplified diagram of a demethanization system typical of conventional practice is shown in FIGURE 1. Dried feed gas mixture 1 is cooled typically to −50° to −80° F. by a pre-cooler consisting of heat exchangers A, B, C, D and E. In heat exchanger A, the refrigerant or heat exchanging gas is residue gas 2 which comprises methane and lighter hydrocarbons. The refrigerant of heat exchanger B is boiling ethane 3; the refrigerant of heat exchanger C is propylene 4; the refrigerant of heat exchanger D is residue gas 2; and, the refrigerant of heat exchanger E is high level ethylene 5.

The pre-cooled feed mixture 1a after leaving heat exchanger E is in a partially condensed state. It is then introduced at feed point F into the fractionator 6 (or demethanizer) which is a conventional fractionating column; the portion 6a of the column being the rectifying section and the portion 6b being the stripping section; the top plate of the stripping section being the feed plate P.

The principal separation between the light and heavy key constituents, methane and ethylene, respectively, is carried out in the fractionator 6; methane and hydrogen being the principal components of the tower overhead vapor 7 and ethylene being the principal component of the bottoms product 8.

As is readily apparent from the flow diagram of FIGURE 1, reflux 10 is provided by partial condensation of the tower overhead vapor 7 by passing said vapor through gross overhead heat exchanger H employing residue gas 2 as the refrigerant and condenser I employing low level ethylene refrigerant boiling at about −140° to −150° F. as the refrigerant gas; the cooled overhead product passing into the liquid-reflux separator drum 9.

The uncondensed vapor 11 constitutes the overhead product from the reflux drum 9 and is usually subjected to additional processing in a supplementary ethylene recovery system 12 to effect recovery of residual ethylene which, in admixture with liquid methane, is returned through pipe 13 to tank 9.

Reboiler heat is provided at the base 14 of the tower by a suitable heating medium 15; condensing propylene or propane vapor and warm water are often employed.

With the conventional system described above and illustrated in FIGURE 1, the power required to operate the refrigeration facilities constitutes a substantial portion of the operating cost of an ethylene recovery system. Consequently, any system which would permit a significant reduction in refrigeration requirements would result in substantial economies of operation. Such an improved system is the subject of this invention.

With the system shown in FIGURE 1, there is for each specific feed composition and degree of desired separation an optimum demethanizer feed temperature corresponding to a minimum consumption of refrigeration power. For the average feed composition, the optimum feed temperature is about −50° F. to −60° F. Further feed cooling, say to −80° F., by refrigeration in exchanger E, results in added condensed methane liquid feed to the stripping section 6b, and requires increased stripping vapors from reboiler 15; the overall result is an increased total horsepower for refrigeration in exchanger E and condenser I, over the total required for a feed temperature of −50° F. to −60° F.

On the other hand, if the feed is cooled only to −30° F., by decreased refrigeration duty in exchanger E, the flow of uncondensed ethylene vapors into the rectifying section 6a will be increased, requiring increased fractionation and increased condensing duty in exchanger I with costly −150° F. refrigeration. The overall result is that the combined refrigeration horsepower is increased over that needed for the −50° F. to −60° F. feed temperature.

We have discovered, however, contrary to what the art has taught as advantageous, that by operating at a higher demethanizer feed temperature than has heretofore been thought optimum, and by operating in accordance with the principles of our invention described hereinafter in detail, it is possible to achieve a high degree of recovery of ethylene and heavier components of the feed mixture with more economic energy consumption than attainable by heretofore employed commercial processes.

Objects and advantages of the invention will be set forth in part hereinafter and in part will be obvious herefrom, or may be learned by practice with the invention, the same being realized and attained by means of the steps, methods, combinations and improvements pointed out in the appended claims.

The invention consists in the novel steps, methods, combinations and improvements herein shown and described.

An object of this invention is to provide an improved, continuous demethanization process, compared to the ordinary process which uses a reboiled fractionating tower having a rectifying and a stripping section which operates at high pressure, approximately 400–500 p.s.i. gage, and in which the reflux liquid at the top of the rectifying section is obtained by partially condensing overhead vapors through indirect exchange with evaporating ethylene liquid at about −150° F.

Another object of this invention is to provide a continuous, demethanization process which provides for the recovery of ethylene in an effective manner with economic energy consumption.

It has been found that the objects of this invention may be realized by departing from conventional demethanization practice in two respects, namely (1) introducing the feed mixture to the fractionator at a temperature level higher than that normally and heretofore considered optimum for a demethanization process feed; and, (2) removing heat from an intermediate position in the rectifying section of the fractionator during the fractionation of the feed mixture. It should be understood that in order to realize the desired objectives and advantages of this invention both of the above mentioned departures from conventional practice must be followed. For example, introducing the feed mixture to the fractionator at a higher level is only advantageous if heat is subsequently removed from an intermediate position in the rectifying section.

The feed is introduced to the fractionator at a temperature level higher than normally considered optimum by merely reducing the extent of cooling that is normally employed in conventional demethanization practice such for example, as reducing the number of heat exchangers through which the feed is normally passed. Generally, the temperature of the feed in our process is −50° F. or higher (e.g. 0° to −50° F.).

Heat may be removed from the intermediate position in the rectifying section in several different ways, each of which will accomplish the advantageous results possible by the present invention. In other words, the heat removal, or cooling, at an intermediate position is the important element involved. The particular means of heat removal is of secondary importance.

Various methods of intermediate cooling are indicated schematically in FIGURES 2–2C, inclusive. These are illustrative only and do not include all applicable methods of removing heat. The rectifying section contains one or more vapor-liquid mixing zones between the fresh feed inlet position and the intermediate heat removal device, in which mixing zones countercurrent contacting of ascending vapor and descending liquid reflux are accomplished. These vapor-liquid mixing zones, usually bubble plate type, are indicated schematically by the short horizontal lines within the fractionator shell outline.

A general concept for effecting intermediate heat removal in the rectifying section is shown in FIGURE 2 which indicates an intermediate cooling device 50 for heat removal, with two bubble plates 51, 51a situated between the cooling device and the feed inlet plate 52, and with four bubble plates 53, 53a, 53b, 53c between the cooling device and the overhead cooling system.

Specific ways of implementing the general concept of intermediate heat removal indicated in FIGURE 2 are shown in FIGURES 2A, 2B and 2C. The temperatures given are approximate as they are dependent upon fluid compositions and operating pressures.

When using an internal vertical partial condenser as illustrated in FIGURE 2B, it would be possible to eliminate use of bubble plates between the partial condenser 70 and the feed inlet, inasmuch as a partial condenser functions as the countercurrent multiple stage contacting device. However, it is preferable to install one or more bubble plates between the cooling device 60 or 80 in FIGURE 2A or 2C and the feed inlet.

Intermediate heat removal is not limited to a single position in the rectifying section of the demethanizer and may be accomplished advantageously in two or more such positions, with one or more bubble plates situated between each of such positions.

In commercial practice, there are practical advantages in accomplishing said intermediate heat removal by use of a vapor partial condenser situated at or near ground level. This is a variation of the external partial condenser design of FIGURE 2A and is shown in the flow diagram of FIGURE 3, which represents a typical embodiment of the improved demethanizer process of the present invention. It will be noted from a study of FIGURE 3, that in general the process is quite similar to that shown in FIGURE 1 and wherein the procedure and apparatus are the same as those shown in FIGURE 1, the same reference numerals are employed. The main differences between the flow diagram of FIGURE 3 and that of FIGURE 1 are as follows:

(1) In FIGURE 3, the ethylene refrigerated pre-cooler E of FIGURE 1 is eliminated so that the pre-cooled feed 1b of FIGURE 3 is at a higher temperature than the pre-cooled feed 1a of FIGURE 1;

(2) In FIGURE 3, an auxiliary side condenser arrangement, designated generally by the reference numeral 20; a side reflux arrangement, designated generally by the reference numeral 30; and, an internal head 40 are provided, none of which are employed in the process of FIGURE 1.

By eliminating the ethylene refrigerated pre-cooler E, which is employed in the process of FIGURE 1, an economy in energy requirement (refrigeration power consumption) is obtained in the process of FIGURE 3. A further economy is achieved in the process of FIGURE 3, by removal of heat above the feed point F by the auxiliary condensing step employing high level ethylene refrigeration and described below in detail.

The demethanization tower 6 (fractionator) of FIGURE 3 is divided into two sections by an internal header 40. Vapors from the stripping section combine with the vapor portion of the feed and pass upwards through a number of rectification trays. Vapors 21, at a temperature higher than the boiling temperature of high level ethylene refrigerant of auxiliary condenser 22, are conducted to the auxiliary condenser 22. The effluent 23 consisting of liquid and vapor (at about −80° F.) from the condenser is returned to the tower above the internal header. Condensed liquid is separated from the uncondensed vapor through line 31 transferred by a pump 32 to the top rectification tray below the internal header 40. Uncondensed vapors 7 pass up through additional rectification trays in the upper section 6a (above the internal header 40) before passing to the heat exchanger H, condenser I and reflux drum 9.

At the higher tower feed temperatures utilized with the improved system of this invention, the reboiler heat duty is reduced below that corresponding to the optimum feed temperature with the conventional system; at the same time, the heat duty of the refrigerated main overhead condenser I is no higher than that corresponding to the coldest attainable feed temperature with the conventional system.

In order to illustrate the invention more specifically, the following specific examples are given.

Table 1, which follows, presents pertinent data relating to both the conventional (FIGURE 1) and improved (FIGURE 3) systems for a typical commercial ethylene plant having a nominal annual production capacity of 250,000 long tons based on naphtha cracking. Data presented include tower heat balance, ethylene refrigerated cooler duties, and power consumptions required to furnish the necessary ethylene refrigeration. The material balance data given apply to all modes of operation considered. These data are based on calculation methods that have proved to be consistent with the performance of commercial units.

The first three columns of data apply to the conventional system and illustrate the variation in refrigeration power requirements with change in feed temperature. Of the three feed temperatures considered, −50° F. results in the lower power consumption of 9,050 HP. The fourth column gives data for the improved system operating with a tower feed temperature of −36° F. and with an auxiliary or side condenser effluent temperature of −80° F. It will be noted that the refrigeration power requirement of 7,981 HP is:

(a) 2,156 HP less than that required for the conventional system operating with feed at −80° F.;

(b) 1,438 HP less than that required for the conventional system operating at the same feed temperature of −36° F.;

(c) 1,069 HP less than that required for the conventional system operating with close to optimum feed temperature of −50° F.

Material Balance:

DATA COMMON TO BOTH SYSTEMS

| Component | Feed (Stream 1) | | Bottoms Product (Stream 8) | | Demethanizer Overhead, to Supplementary Ethylene Recovery System (Stream 11) | | Residue Gas (Stream 2) | |
|---|---|---|---|---|---|---|---|---|
| | Mol/Hr. | Lb./Hr. | Mol/Hr. | Lb./Hr. | Mol/Hr. | Lb./Hr. | Mol/Hr. | Lb./Hr. |
| $H_2$ | 1,023 | 2,063 | | | 1,027 | 2,072 | 1,023 | 2,063 |
| $CH_4$ | 2,780 | 44,590 | 2 | 32 | 3,078 | 49,383 | 2,778 | 44,558 |
| $C_2H_2$ | 26 | 677 | 26 | 677 | | | | |
| $C_2H_4$ | 2,674 | 75,006 | 2,655 | 74,473 | 72 | 2,023 | 19 | 533 |
| $C_2H_6$ | 645 | 19,395 | 645 | 19,395 | 1 | 23 | | |
| $C_3H_6$ | 1,207 | 50,791 | 1,207 | 50,791 | | | | |
| $C_3H_8$ | 46 | 2,028 | 46 | 2,028 | | | | |
| $C_4$'s | 266 | 14,759 | 266 | 14,759 | | | | |
| $C_5+$ | 33 | 2,405 | 33 | 2,405 | | | | |
| | 8,700 | 211,714 | 4,880 | 164,560 | 4,178 | 53,501 | 3,820 | 47,154 |

Temperatures, °F.:
- Feed gas to system _____ 60
- Residue gas from system _____ 45
- Bottoms product from system _____ 53
- Reflux drum _____ −144
- High level ethylene refrigerant _____ −90
- Low level ethylene refrigerant _____ −470

Pressure in reflux drum, p.s.i.a. _____ 470

| | Conventional System (Fig. 1) | | | Improved System (Fig. 2) |
|---|---|---|---|---|
| Temperature of Tower Feed, °F | −80[3] | −50[3] | −36[4] | −36[4] |
| Tower Heat Balance (MM B.t.u./Hr.): | | | | |
| Heat Content of Feed | −4.997 | 2.328 | 6.144 | 6.144 |
| Reboiler Duty | 20.435 | 16.360 | 15.624 | 15.624 |
| Total Heat Input | 15.438 | 18.688 | 21.768 | 21.768 |
| Heat Content Residue Gas [1] | 9.414 | 9.414 | 9.414 | 9.414 |
| Heat Content Net Bottoms Product | −1.600 | −1.600 | −1.600 | −1.600 |
| Overhead Condenser Duty | 7.624 | 10.874 | 13.954 | 7.624 |
| Side Condenser Duty | | | | 6.329 |
| Total Heat Output | 15.438 | 18.688 | 21.768 | 21.767 |
| Ethylene Refrigerated Cooler Duties (MM B.t.u./Hr.): | | | | |
| Duty −90° F. Refrigerated Pre-Cooler | 11.141 | 3.816 | | |
| Duty −90° F. Refrigerated Side Condenser [5] | | | | 6.329 |
| Total −90° F. Refrigeration Duties | 11.141 | 3.816 | | 6.329 |
| Duty −150° F. Refrigerated Overhead Condenser | 7.624 | 10.874 | 13.954 | 7.624 |
| Power Requirements To Provide Ethylene Refrigeration: [2] | | | | |
| BHP Required for −90° F. Pre-Cooler Duty | 4,991 | 1,710 | | |
| BHP Required for −90° F. Side Condenser Duty | | | | 2,835 |
| Total BHP Required for −90° F. Duties | 4,991 | 1,710 | | 2,835 |
| BHP Required for −150° F. Overhead Condenser Duty | 5,146 | 7,340 | 9,419 | 5,146 |
| Total BHP Required for all Ethylene Refrigeration Duties | 10,137 | 9,050 | 9,419 | 7,981 |

[1] Leaving Gross Overhead Exchanger.
[2] Includes Power Requirements of Associated Propylene Refrigeration Required to Condense Ethylene Refrigerant 70% Compressor Efficiencies Assumed.
[3] Temperature of Feed Leaving Ethylene Refrigerated Pre-Cooler.
[4] No Ethylene-Refrigerated Feed Pre-Cooler.
[5] Temperature of Process Stream Leaving Side Condenser=80° F.

The invention in its broader aspects is not limited to the specific steps, methods, combinations and improvements described but departures may be made therefrom within the scope of the accompanying claims without departing from the principles of the invention and without sacrificing its chief advantages.

What is claimed is:

1. In an improved, continuous demethanization process for more economic recovery of ethylene from feed mixtures containing constituents both more and less volatile than ethylene, the feed mixtures consisting predominantly of hydrogen, methane, ethylene, propylene and higher boiling hydrocarbons, which process comprises generally subjecting a cooled feed mixture to fractionation under a pressure in the range 350–700 p.s.i.a. in a fractionator having a rectifying section refluxed at the top by condensed liquid obtained by indirect heat exchange with liquid ethylene evaporating at −120° F. to −165° F., and having a reboiled stripping section, to obtain an overhead product comprised of feed constituents more volatile than ethylene with but a small amount of ethylene, and a bottoms product comprised of ethylene and less volatile constituents with but a small amount of methane, the improvements in said process for achieving a more economic process with respect to energy consumption being:

(a) introducing the feed mixture to the fractionator at a temperature in the range of −50° F. to −10° F. which is a temperature level higher than that normally considered optimum for a demethanization process feed; and (b) removing heat from at least one intermediate position in the rectifying section with at least one fractionating bubble plate intervening between the point at which feed mixture is introduced to the fractionator and the position at which intermediate heat removal is accomplished, said heat removal being done by indirect heat exchange with liquid ethylene or ethane evaporating at a temperature level intermediate between the temperature of the feed and the temperature of the liquid reflux returned to the top of the rectifying section, said intermediate temperature level refrigerant being in the range of −60° F. to −100° F.

2. In a demethanizer process according to claim 1, wherein the overhead product contains less than 5 mol percent ethylene, and the bottoms product contains less than 1 mol percent methane.

References Cited

UNITED STATES PATENTS

| 2,214,790 | 9/1940 | Greenewalt | 62—28 |
| 2,777,305 | 1/1957 | Davison | 62—28 XR |
| 2,471,602 | 5/1949 | Arnold | 62—27 |
| 2,880,592 | 4/1959 | Davison et al. | |
| 2,953,905 | 9/1960 | Chrones et al. | 62—28 |
| 3,111,402 | 11/1963 | Cunningham | 62—27 |
| 3,262,278 | 7/1966 | Thorsten et al. | 62—28 XR |

NORMAN YUDKOFF, *Primary Examiner.*

V. W. PRETKA, *Assistant Examiner.*

U.S. Cl. X.R.

62—40